3,117,950
PREPARATION OF IMPROVED LINEAR COPOLY-ESTERS EMPLOYING TWO STAGES TO POLYM-ERIZE SOLID PARTICLES

Charles J. Kibler, Nicholas C. Russin, and Alan Bell, Kingsport, Tenn., assignors to Eastman Kodak Company, Rochester, N.Y., a corporation of New Jersey
No Drawing. Filed Mar. 25, 1959, Ser. No. 801,705
22 Claims. (Cl. 260—75)

Among other things, this invention relates to fibers, films and other products which can be produced having increased melting points, flow points and related high temperature properties from copolyesters which have been produced by a process wherein solid phase polymerization of prepolymer particles is carried out in two stages. The first stage involves heating the particles at 35–100° C. below the normally expected melting point of the corresponding normal ultimate copolyester for at least 1½ hours and then in a second stage heating the particles at a temperature at least 10° C. below the melting point of the ultimate abnormalized copolyester until an abnormalized copolyester is produced which has a melting point at least 10° C. greater than the normally expected melting point of the corresponding ultimate normal copolyester. Usually this process results in improvements of melting points of 10–50° C. Fibers from the abnormalized copolyester have a flow point at a much higher temperature than normal.

From considerations of various theories which may be applicable to the present invention it would appear that the abnormalized copolyesters of this invention are block-type copolyesters. The concept of block versus random copolyesters has existed for a number of years. Indeed, in the addition or condensation-type polymer field it is difficult to prepare true random copolymers, the block type usually predominating due to the difference of the activity of the monomeric starting materials. Various investigators of copolyesters have tried several techniques for producing block-type copolyesters and made numerous observations about techniques involved and characteristics of the products produced.

The method disclosed herein is an unobvious and unique procedure for obtaining high melting abnormalized copolyesters which are believed to have a unique physical configuration. This method involves the direct preparation of random-type copolyester prepolymers which are then treated in such a way as to raise the melting points by means of what is presumably a blocking of the random-type structure.

It is an object of this invention to increase the high temperature properties of copolyesters by an entirely new and novel technique involving two stages of solid phase polymerization.

It is a further object of this invention to provide abnormalized copolyesters having melting points at least 10° C. greater than the normally expected melting point of the corresponding ultimate copolyester.

It is another object of this invention to provide abnormalized copolyesters which are believed to have a unique configuration because of the unique process in which they are produced.

It is an additional object of this invention to produce fibers prepared from such abnormalized copolyesters which have increased flow points compared to fibers produced from normal copolyesters.

It is a further object of this invention to provide fibers, film and other polyester products which have high temperature properties of greatly improved quality compared to normal polyesters produced in accordance with the techniques now commonly used by those skilled in the art to which this invention pertains.

In acordance with an embodiment of this invention there is provided a process for preparing a linear abnormalized copolyester of (A) at least one glycol and (B) at least one dibasic acid comprising at least 60 mole percent of an acid having two carboxyl radicals attached to a carbocyclic nucleus having from 4 to 6 carbons per ring, in which copolyester at least three components are present, one of which can be present as an isomer of one of the other two components, said copolyester having a number average molecular weight between about 15,000 to about 100,000, an intrinsic viscosity in a mixture of 60% phenol and 40% tetrachloroethane of at least 0.60 and having a melting point differential of from 10° to 50° C. above the melting point of the corresponding normal random-type copolyester, which process comprises the following three phases:

*Phase 1.*—Heating at least three (preferably three or four) reactants consisting essentially of (A) from 1.05 to 2.5 mole proportions of at least one glycol including at least 75 mole percent of at least one member (preferably 2 members) selected from the group consisting of the cis and trans isomers of 1,4-cyclohexanedimethanol and (B) at least (preferably one or two) of said above-designated dibasic acids in a form selected from the group consisting of the free acid, a lower alkyl (1–6 carbons) diester, anhydride and acid chloride, said heating being under conditions such that at first there is removed substantially all of any water, hydrogen chloride and alkanol corresponding to said forms of said dibasic acids and mostly subsequent thereto there is removed an amount of the excess of said glycol whereby an intermediate copolyester prepolymer having an inherent viscosity of from about 0.1 to about 0.45 is obtained;

*Phase 2.*—Comminuting said prepolymer to form solid particles substantially completely passing a 20 mesh screen with less than 25% passing a 200 mesh screen;

*Phase 3.*—In an enclosed polymerizing zone heating said particles in two polymerization stages as follows:

*Stage I.*—Firstly at a temperature of about 170°–300° C. and about 35° to 100° C. below the normally expected melting point of the corresponding ultimate normal copolyester, which temperature is no higher than that at which said particles would begin to appreciably cohere and would require a correspondingly greater stirring energy, said temperature being maintained for at least 1½ hours until an abnormalized prepolymer is produced having an inherent viscosity essentially the same as that of the prepolymer at the beginning of stage (I); and

*Stage II.*—Secondly at a temperature at least 20° C. below the melting point of the ultimate abnormalized copolyester and at a temperature no higher than that at which said particles would require appreciably greater stirring energy, which temperature is maintained until an abnormalized copolyester is produced which has a melting point at least 10° C. greater than the normally expected melting point of the corresponding ultimate normal copolyester.

The process described can be conducted in accordance with numerous variations and modifications. The two polymerization stages can be accomplished in accordance with methods which have been described in the art as well as in accordance with techniques described in copending applications such as in Kibler et al. application Serial No. 554,639, filed December 22, 1955, now U.S. Patent No. 2,901,466, granted on August 24, 1959, or as in Coover et al. application Serial No. 788,043, filed on January 21, 1959, now U.S. Patent No. 3,075,952, entitled "Solid Phase Process for Linear Super-Polyesters." At least one of the polymerization stages can be accomplished by stirring said particles under an inert atmosphere under very low pressure such as a pressure of less than 1 cm. of Hg pressure. Alternatively, the latter of the polymerization stages can be accomplished by stirring said particles in the presence of an inert gas at about atmospheric pressure which flows through the polymerizing zone at from 10 to about 1,000 ml. of inert gas per minute per gram of said particles. Stage I can be similarly performed if the flow rate is kept well below 10 ml./min./g. so as to avoid too high a degree of polymerization. If any of the inert particles are more than about 5 mm. from the surface across which the inert gas flows, the particles should be agitated into contact with said inert gas in order to efficaciously accomplish the polymerization.

According to a preferred embodiment of this invention the process is performed wherein the glycol is 1,4-cyclohexanedimethanol. This glycol can be composed of any proportions of its cis and trans isomers including the 100% cis isomer and the 100% trans isomer. The use of this glycol in the preparation of linear polyesters and copolyesters is described in the above-mentioned copending application Serial No. 554,639, filed December 22, 1955, by Kibler, Bell and Smith, "Linear Polyesters and Polyester Amides from 1,4-Cyclohexanedimethanol." It appears that the present invention can only be employed with regard to other glycols so as to achieve advantageous results of the order obtained in accordance with the invention only in special cases. Subsequent patent applications will be filed describing other such special cases.

Examples of hexacarbocyclic dicarboxylic acids wherein the carboxy radicals are attached to a hexacarbocyclic nucleus in para relationship include terephthalic acid, trans-hexahydroterephthalic acid, p,p'-sulfonyldibenzoic acid, 4,4'-diphenic acid, 4,4'-benzophenonedicarboxylic acid, 1,2 - di(p-carboxyphenyl)ethane, 1,2-di(p-carboxyphenoxy)ethane, 4,4'-dicarboxydiphenyl ether, etc. All of these acids contain at least one hexacarbocyclic nucleus. Fused rings can also be present such as in 2,7-, 1,4- or 1,5-naphthalenedicarboxylic acid. The hexacarbocyclic dicarboxylic acids are preferably those containing a trans-cyclohexane nucleus or an aromatic nucleus containing from one to two benzene rings of which at least one has the usual benzenoid unsaturation. Of course, either fused or attached rings can be present. All of the compounds named in this paragraph come within the scope of this preferred group.

Examples of other bifunctional dicarboxylic organic acids which are adapted to the formation of linear polyesters and which can be employed in accordance with this invention as described above include oxalic acid, carbonic acid, succinic acid, adipic acid, sebacic acid, azelaic acid, α-ethylsuberic acid, α,α-diethyladipic acid, dimethylmalonic acid, dicarboxy diethyl ether, isophthalic acid, orthophthalic acid, hexahydro-ortho-phthalic acid, etc. Carbonic acid is an obvious equivalent included among these other acids.

In addition to mixtures of dicarboxylic organic acids, the polyesters defined in this invention can also be modified by the employment of hydroxy acids such as hydroxypivalic acid, hydroxybutyric acid, hydroxycaproic acid, p-hydroxybenzoic acid, etc.

Examples of modifying glycols which can be employed in accordance with this invention include the polymethylene glycols containing from 2 to 10 or more carbon atoms such as ethylene glycol, 1,5-pentanediol, 1,10-decanediol, and other glycols of this series as well as the ether glycols such as diethylene glycol, triethylene glycol, etc. Branched chain aliphatic glycols which can be employed include 2,2-dimethyl-1,3-propanediol, 2-methyl-1,5-pentanediol, etc. Carbocyclic glycols can also be employed such as 1,4-di(hydroxyethyl)benzene. Other glycols which can be employed include various derivatives of those already mentioned which contain nitrogenous substituents or numerous other substituents which do not interfere with the formation of a highly polymeric linear polyester. Those familiar with the art will be aware of the effect of various substituents on melting points and other properties of the polyesters produced. It is well known that there is quite a variety of these glycols available for the preparation of linear polyesters.

The polyesters of this invention which contain a mixture of dicarboxylic organic acids have unexpectedly high melting points for modified polyesters of this character and in addition have improved dyeing qualities whereby fibers can be prepared which can be woven into fabrics which dye to deep shades without the use of a carrier as is generally employed with polyethylene terephthalate dyeing procedures.

The linear polyester compositions of this invention are generally characterized by superior weathering properties and resistance to moisture whereby the products having from the higher down to the relatively low melting points are markedly more efficacious than the products produced from glycols other than 1,4-cyclohexanedimethanol.

The methods of forming the polyesters of this invention into fibers and films are well known in the art and need no elaboration herein; in brief, the polyesters of this invention can be heated and melt extruded followed by quenching, drawing, and heat setting employing techniques that are described in the prior art.

When the process of this invention is conducted using only one dibasic acid, it is necessary that the 1,4-cyclohexanedimethanol be present as a mixture of isomers including at least 20% of one of its cis and trans isomers, preferably at least 50% trans.

According to a preferred embodiment of this invention terephthalic acid is an especially useful dibasic acid. The terephthalic acid can be partially replaced with from 10 to 40% or more of an aliphatic dibasic acid containing from 1 to 40 carbon atoms. If only one isomer of 1,4-dicyclohexanedimethanol is employed it is necessary that 10–25 mole percent of another glycol (2–12 carbon atoms) or 10–40% of another dibasic acid be employed in order to practice this invention so that a total of at least three components will be present in the copolyester being abnormalized.

As previously mentioned, the linear abnormalized copolyesters produced by the process defined above are believed to have a unique structure. The theory involving the structure of block-type copolyesters is not very well understood and it is obvious that a great multitude of different possible structural configurations might be capable of creation depending upon the precise techniques involved and their preparation. Since the process of this invention involves a unique approach to the preparation of block-type copolyesters, it is believed that the structures are unique. This is especially likely in instances where a certain glycol produces an especially advantageous result when employed in accordance with the techniques described herein. The glycol particularly concerned is 1,4-cyclohexanedimethanol (either isomer or a mixture of isomers). Separate applications may be filed particularly covering similar results with respect to other advantageous glycols.

The three phases set forth above describing the process according to a preferred embodiment of this invention have been separated in this description because the first phase is primarily descriptive with regard to the prepolymer which is used in performing the third phase wherein the crux of the invention primarily resides. Of course, in order to have the third phase function advantageously, it is necessary that the second phase of the process be complied with and that the prepolymer be of the type produced by the process described in the first phase.

The first phase of the process is necessarily somewhat generally stated but will be completely clear and readily understood by those persons skilled in the art to which this invention pertains since the processes used in the preparation of such relatively low molecular weight polyesters are well known in the art and have been described in many patents and publications. It is not believed worth while in this specification to give numerous examples which are readily available in the prior art as to how such prepolymers can be produced. Perhaps one of the more significant observations in regard to this phase of the process is that the preparation of the prepolymer should be such as to not allow the inherent viscosity of the relatively low molecular weight polyester to appreciably exceed about 0.5. In most cases a much lower inherent viscosity (I.V.) not exceeding 0.45 will be advantageously useful.

The comminuting of the prepolymer to form solid particles in accordance with the second phase of the process as described above can be advantageously performed with any of the common grinding or comminuting devices well known in the art. The only aspect of importance is the size of particles produced. If the particles are quite large, the effectiveness of the entire process is greatly reduced since the interior of large particles will not respond to the process in the same way as the exterior. If a large proportion of the particles are so small as to pass a 200 mesh screen, there will be practical difficulties in handling the material during the third phase of the process since fine dust may clog the evacuating equipment or may be carried away during the flow of any inert gas across the material being polymerized.

The last phase of the process is divided into two polymerization stages which are conducted in any convenient enclosed polymerizing zone. Such a zone can be a horizontal or vertical reaction vessel which most advantageously is provided with a device for agitating the particles being polymerized therein. Such a device can be of the type commonly used in a cement manufacturing industry or in the industries involved with the handling of powdered coal wherein fluidized techniques are commonly employed. Thus, an aeration device can be provided which causes the particles to be fluidized and the fluidized mix lends itself readily to polymerization under the specified conditions. Further details as to such techniques are given in the copending Coover et al. application mentioned above.

There are obviously quite a few variations in accordance with which the two stages of phase 3 can be accomplished. The general temperature range for the heating of the random-type copolyester prepolymer particles in the first stage is about 170°–300° C. depending upon the particular prepolymer. This first stage is performed under conditions such that some of the glycol is allowed to remain in the system. In other words, it is apparent that no effort is made to remove all traces of glycol in excess of that theoretically necessary to produce the highest possible molecular weight. During this first stage of the third phase of the process the intrinsic viscosity of the polyester will not ordinarily exceed about 0.6 and will usually be below 0.45–0.5 at the most. The time required during stage I to produce the abnormalized prepolymer will usually be at least 1½ hours. Thus if the prepolymer at the beginning of stage I has an I.V. of about 0.3, the abnormalized prepolymer at the end of stage I will have an I.V. on the order of about 0.3. It appears that less advantageous results are accomplished in practicing this invention if the I.V. of the abnormalized prepolymer at the end of stage I is much greater than about 0.45. It is quite important that stage I takes place over a sufficiently long time period to allow abnormalization of the prepolymer to take place without the I.V. changing to any substantial degree, e.g. 10% change.

Regardless of the technique used in accomplishing phase 1 of the process of this invention, the most effective results are achieved during phase 3 if the prepolymer includes an ester interchange type of catalyst of the type which would normally be used if the prepolymer were being made by the condensation of a diester of a dibasic acid with a glycol. The prior art describes a great number of such catalysts and some of these catalysts are described in patents such as U.S. 2,720,502 and 2,727,881 although many other catalysts are also described in other publications. Even if such a catalyst is not necessarily needed during a process which involves reaction of an acid halide with a glycol it can be added (such as at the end of phase 1) in order to achieve improved results in phase 3 of the over-all process.

In conducting the two stages of phase 3 it is advantageous to apply a temperature which is no higher than that at which the particles would require appreciably greater stirring energy than at ambient temperatures. The load on the stirrer in those cases where a simple mechanical stirring device is used can be observed and when the load increases significantly it is apparent that the particles are beginning to cohere or stick together. If much softening of the prepolymer during the first stage is allowed to take place, the product of stage I will be difficult to handle and may require an additional step of comminution before stage 2 can be undertaken. If it is desired to avoid this situation, it is useful to begin with a prepolymer which is significantly higher than 0.1 I.V. Thus, a prepolymer of an I.V. of no less than 0.15 and preferably of at least 0.2 or greater can be more advantageously handled during the first stage of the third phase of the process.

According to one embodiment of the practice of this invention the abnormalization of the prepolymer to form a high melting polymer is accomplished at a temperature at which the prepolymer becomes tacky but below the temperature at which it melts sufficiently to completely destroy the particulate form of the prepolymer. By such a process the melting point of the prepolymer obtained from the reaction of 60 mole percent of terephthalic acid and 40 mole percent of succinic acid ester with 1,4-cyclohexanedimethanol (70 percent trans) is raised from 194–200° C. to 230–238° C. This abnormalized block-type prepolymer can then be further polymerized in accordance with the second stage of phase 3 to form a high polymer having an I.V. of 0.8–1.5 and a melting point of 268–270° C. When the original prepolymer is polymerized without this special abnormalized special treatment the normal process gives a melting point of only 230–238° C. Thus, in this particular case, an increase in melting point of approximately 30° C. is realized. This permits the use of larger amounts of modifying dibasic acids in the preparation of copolyesters so as to obtain special properties such as dyeability without carriers and yet have high heat distortion temperatures, high ironing temperatures, etc. as in the case of the homopolyesters.

Since it might be supposed that one or both of the stages during phase 3 could conceivably bring about the removal of one of the components so as to accomplish the advantages of this invention by understood means in certain cases, analysis of the high melting polyesters obtained by the process of this invention have been performed and the results obtained show that the high melting points are not a result of removal of one of the components. In some cases the abnormalized copolyesters were saponified and found to contain the ratios of starting materials employed in accordance with the process both with regard to the proportions of dibasic acids and the proportions of the isomers of 1,4-cyclohexanedimethanol. Other methods of analysis such as the precipitation of the polymers from solution by addition of a precipitant (or known solvent) have confirmed these analyses.

This invention can be further illustrated by the following examples of preferred embodiments although it will be understood that these examples are included merely for purposes of illustration and are not intended to limit the scope of the invention unless otherwise specifically indicated.

*Example 1*

(a) *Preparation of the prepolymer.*—A mixture of 3.17 g. (0.022 mole) of 1,4-cyclohexanedimethanol (70% trans isomer), 2.33 g. (0.012 mole) of dimethyl terephthalate, 0.8 g. (0.008 moles) of succinic anhydride, and 1 drop of a 14.8% of titanium tetrabutoxide solution in butanol was heated at 180–220° C. for 30 minutes, and then at 230–240° C. for 30 minutes under a nitrogen atmosphere. The pressure was then reduced to 1–3 mm. of mercury for 10 minutes, the temperature increased to 260–280° C., and the low molecular weight polymer (I.V.=0.15 to 0.30) was allowed to cool under vacuum. This prepolymer was pulverized to pass a 60-mesh screen.

(b) *Rearrangement of prepolymer to a block prepolymer.*—Two grams of the above pulverized prepolymer (M.P. 180–190° C.) were placed in a suitable tube under a nitrogen atmosphere (very slow sweep) and heated in a heating block at 180° C. for 15 minutes, followed by 1 hour at 205° C. and 30 minutes at 240° C. The fine powder was partially sintered but not melted. It was pulverized again to pass 60 mesh and heated at 205° C. at 0.07 mm. for 3 hours. The inherent viscosity as determined in phenol tetrachloroethane (60–40) was 1.84 and had a melting point of 265–273° C.

As shown by this example the first stage of phase 3 was conducted for 1 hour and 45 minutes at various temperatures ranging from 180° C. to 240° C. As will be shown in Example 2, the melting point of the ultimate normal polyester is 235–240° C. so that stage I was conducted at temperatures of from 30°–60° C. below this melting point. The second stage of phase 3 was conducted at 205° C. which is 60°–68° C. below the melting temperature of the ultimate abnormalized block-type copolyesters.

The following example merely serves to furnish a basis for establishing a meritorious and unobvious aspect of this invention.

to a pressure of 30 microns. Under these conditions, polymerization occurs to give a polymer with an I.V. of 0.85–0.95 in 4 hours. The melting point of this product was 264–270° C. If the polymerization of this prepolymer was carried out in the normal manner, i.e., without heating at 195° C. for 3 hours in an $N_2$ atmosphere, the resulting polymer melted at 235–245° C.

As can be seen from this example, stage I of the third phase of the process was conducted at 195° C. for 3 hours. This temperature is 40–50° C. below the melting point of the corresponding normal ultimate polyester. The abnormalized prepolymer thereby produced was then polymerized during stage II at the same temperature but under circumstances which permitted the I.V. to exceed the limit of about 0.45 which is normally imposed upon the abnormalized prepolymer produced during stage I. The temperature used during stage II was 69–75° C. below the melting point of the abnormalized ultimate block-type copolyester, hence, no sticking together of the particles was encountered.

The same process was used for carrying out the following examples wherein stage I was conducted for 3 hours after the temperature of the prepolymer particles reached 195° C. The slow stream of nitrogen passing through the reactor was well below the minimum rate of 10 ml. of inert gas per minute per gram of particles which would be employed if this method of polymerization were to be used during stage II since it is the purpose of stage I to accomplish abnormalization of the prepolymer and to prevent the formation of a normal ultimate polyester. Thus, the following modified polyesters from terephthalic acid and 1,4-cyclohexane-dimethanol were prepared using the conditions noted in the table below.

| Example No. | Modifying acid (mole percent) | Diol (percent trans) | Random copolymer, M.P. | Conditions for forming block | | Block polymer, M.P. | I.V. |
|---|---|---|---|---|---|---|---|
| | | | | Time, hr. | Temp. | | |
| 4 | 25% succinic | 78 | 248–254 | 6 | 210–215 | 288–294 | 0.87 |
| 5 | 17% glutaric | 70 | 245–252 | 4 | 230 | 291–297 | 0.93 |
| 6 | do | 95 | 272–278 | 3 | 240 | 305–315 | 0.85 |
| 7 | 20% glutaric | 95 | 265–270 | 3 | 230 | 290–298 | 0.81 |
| 8 | 25% glutaric | 95 | 256–263 | 4 | 205 | 280–286 | 0.76 |
| 9 | do | 78 | 236–242 | 4 | 205 | 265–277 | 0.97 |
| 10 | 30% glutaric | 95 | 240–245 | 4 | 205 | 265–275 | 1.03 |
| 11 | 25% sebacic | 78 | 240–248 | 4 | 205 | 265–272 | 1.08 |
| 12 | 25% azelaic | 78 | 235–247 | 4 | 205 | 262–270 | 0.98 |
| 13 | 10% glutaric and 10% succinic | 78 | 242–250 | 4 | 220 | 265–270 | 0.95 |
| 14 | No modifying acid | 70 | 290–293 | 4 | 250 | 305–315 | 0.80 |
| 15 [1] | do | 0 (100% cis isomer) | 258–260 | 4 | 240 | 258–261 | 0.93 |

[1] If there is no modification of the polyester in either the acid component or in the diol component, the above treatment will not alter the melting point.

*Example 2*

A polyester prepared as in Example 1(a) except that an equivalent amount of dimethyl succinate was used in place of the succinic anhydride was polymerized at 205° C. for 3 hours at 0.07 mm. without the special treatment given in Example 1(b) and had a viscosity of 1.72 but melted at 235–240° C.

*Example 3*

Ten pounds of pulverized prepolymer with the composition 60% terephthalic acid, 40% succinic acid, and the diol being 1,4-cyclohexanedimethanol (70% trans) was charged into a suitable reactor equipped with sweep stirrer rotating at 5–15 r.p.m. The system was evacuated to remove traces of oxygen, and then the system was let down to atmospheric pressure with nitrogen. With a very slow stream of nitrogen passing through the reactor, the temperature was raised to 195° C. When the polymer temperature reached 195° C., it was held at this temperature for 3 hours. The system was then evacuated

*Example 16*

Eight pounds of dry, pulverized prepolymer with the composition of 60% terephthalic, 40% succinic, and the diol being 1,4-cyclohexanedimethanol (70% trans) was loaded into a clean, $N_2$-purged reactor at 100° C. The pressure in the system was reduced to 30″ mercury vacuum at the rate of 1″ per minute during which time the prepolymer was stirred every 5 minutes at a stirring speed of 9 r.p.m. The system was maintained at these conditions for 1 hour during which time the pressure continued down to 50 microns and the polymer temperature increased to 101° C. At this point the temperature of the heating medium, heat transfer oil, was increased to 150° C. The system was kept at this temperature for 1 hour with stirring every 10 minutes. The oil temperature was raised to 175° C. at which time the stirrer was turned on for continuous stirring. The pressure had leveled off at 15–20 microns by this time. The system was held at these conditions for two hours during which time the prepolymer temperature rose from 152° to 179° C. At this point the oil temperature was raised to 200° C. At the same time it was noted that the load on the stirrer increased, indicating softening of the prepolymer. The system was kept at these conditions for 5½ hours during which time the prepolymer temperature rose from 195° to 207° C. The system was then let to atmospheric pressure with nitrogen and the system left to cool. The reactor was taken apart and the product which was partly melted on the stirrer removed. This product had an inherent viscosity of 0.27 and a melting point of 230–238° C.

It was pulverized (40–120 mesh) and put back into the same reactor at 175° C. The pressure of the system was reduced to 30" mercury vacuum at the rate of 1" per minute with stirring every 5 minutes at 9 r.p.m. The system was held at these conditions for 1 hour during which time the polymer temperature rose from 131° to 175° C. and the pressure decreased to 30 microns. The oil temperature was increased to 200° C., and the stirrer was turned on for continuous stirring. When the polymer temperature reached 200° C. the system was held for 5 hours at a reduced pressure which leveled off at 20 microns. The system was let to atmospheric pressure with nitrogen and the product was extruded. This product had an inherent viscosity of 0.90 and a melting point of 265–275° C.

A sample of this polymer was degraded by heating with alkali and the amount of succinic acid found was 39%. The 1,4-cyclohexanedimethanol was found to contain the same ratio of cis and trans isomers as the starting material—70% trans. These analyses prove that the abnormally high melting point is not due to change in ratio of the reagents during the reaction.

*Example 17*

A fiber melt spun from the polymer of Example 16 gave a fiber which after orientation and heat setting had a flow point of 228° C. under a stress of 2 g./denier.

An oriented and heat set fiber spun from the polymer of Example 2 (normal type preparation) had a flow point of 200° C. under a stress of 2 g./denier. Thus, an improvement in flow point of 28° C. is realized in Example 17.

The linear abnormalized copolyesters of this invention as melt-extruded films can be advantageously employed as supports for photographic emulsions of either the black-and-white or color types. As a result of the abnormalization techniques of this invention, the supports have unusually advantageous high temperature properties that are especially efficacious in photographic applications such as in the projection of motion pictures.

The abnormalized copolyesters of this invention in the form of fibers have excellent high temperature characteristics already referred to which render them efficacious in the manufacture of textiles and various fabrics where high heat distortion temperatures, high ironing temperatures, high temperature dye baths and the like may be involved.

The techniques for forming fibers and film by melt extrusion or spinning are well known in the art and need no elaboration in this specification. Melt spun fibers are commonly oriented and heat set in order to achieve optimum properties. Melt extruded film can be drafted and/or tentered followed by heat setting depending upon whatever ultimate objectives are intended. For photographic purposes the film is advantageously biaxially oriented and heat set. When the film is to be used for packaging or for other less rigorous purposes it may be employed without orientation in more than one direction. Such film has excellent high temperature properties and can be readily dyed because of the modifying constituent when two dibasic acids are employed.

The invention has been described in detail with particular reference to preferred embodiment thereof, but it will be understood that variations and modifications can be effected within the spirit and scope of the invention as described hereinabove and as defined in the appended claims.

We claim:

1. A process for preparing an improved linear copolyester of a dibasic acid component and a glycol component, in which copolyester at least three components are present, and wherein from 60 to 100 mole percent of said acid component is an organic acid having two carboxy radicals attached to a hexacarbocyclic nucleus, and the remainder of said acid component is a different dibasic organic acid having from 1 to 16 carbon atoms, and wherein from 75 to 100 mole percent of said glycol component is a member selected from the group consisting of the cis and trans isomers of 1,4-cyclohexanedimethanol, and the remainder of said glycol component is a different glycol having from 2 to 12 carbon atoms, said process comprising two stages of operation conducted under an inert atmosphere at a pressure no greater than about atmospheric pressure as follows:

Stage I—heating solid particles of a prepolymer of said copolyester having an intrinsic viscosity of from about 0.1 to about 0.45 in an enclosed polymerizing zone at a temperature of about 170° to 300° which temperature is also about 35° to about 100° below the melting point of said improved copolyester, said temperature being maintained for at least 1.5 hours until said prepolymer has attained an increased inherent viscosity which has increased by no more than 0.1 unit higher than at the beginning of this stage I, said particles substantially completely passing a 20 mesh screen with less than 25% passing a 200 mesh screen, Stage II—heating said particles obtained by stage I in an enclosed polymerizing zone at a temperature above that in stage I but at least 20° below the melting point of said improved copolyester until an inherent viscosity is attained of at least 0.6, whereby said improved polyester has a melting point differential of from 10° to 50° above the melting point of a corresponding polyester produced without the employment of said preliminary stage I prior to said final stage II, said temperatures being in degrees Centigrade and said inherent viscosities being measured in a mixture of 60% phenol and 40% tetrachloroethane.

2. A process as defined in claim 1 wherein at least one of the polymerization stages is accomplished by stirring said particles under an inert atmosphere at a pressure of below 1 cm. of Hg pressure.

3. A process as defined in claim 1 wherein at least one of the polymerization stages is accomplished by stirring said particles in the presence of an inert gas at about atmospheric presure which flows through said polymerizing zone at less than 10 ml./min./g. when during said preliminary stage of operation, and at from about 10 to about 1,000 ml./min./g., when during said final stage, said ml. being of inert gas per minute per gram of said particles, any of said particles more than 5 mm. from the surface being agitated into contact with said inert gas.

4. A process as defined by claim 1 wherein said 1,4-cyclohexanedimethanol is the sole glycol and is a mixture of isomers including at least 20% of one of its cis and trans isomers and said dibasic acid is solely terephthalic acid.

5. A process as defined by claim 1 wherein said 1,4-cyclohexanedimethanol is the sole glycol and said dibasic acid is composed of from 60 to 90 mole percent of terephthalic acid and from 40 to 10 mole percent of an aliphatic dibasic acid containing from 1 to 20 carbon atoms.

6. A process as defined by claim 5 wherein the 1,4-cyclohexanedimethanol is about 60–100% trans isomer and the aliphatic dibasic acid is succinic acid.

7. A process as defined by claim 5 wherein the 1,4-cyclohexanedimethanol is about 60–100% trans isomer and the aliphatic dibasic acid is glutaric acid.

8. A process as defined by claim 5 wherein the 1,4- cyclohexanedimethanol is about 60–100% trans isomer and the aliphatic dibasic acid is sebacic acid.

9. A process as defined by claim 5 wherein the 1,4-cyclohexanedimethanol is about 60–100% trans isomer and the aliphatic dibasic acid is azelaic acid.

10. A linear improved copolyester produced by the process defined by claim 1.

11. A linear improved copolyester produced by the process defined by claim 5.

12. A linear improved copolyester produced by the process defined by claim 6.

13. A linear improved copolyester produced by the process defined by claim 7.

14. A linear improved copolyester produced by the process defined by claim 8.

15. A linear improved copolyester produced by the process defined by claim 9.

16. An oriented heat set fiber of the improved copolyester defined by claim 10.

17. An oriented heat set fiber of the improved copolyester defined by claim 11.

18. An oriented heat set fiber of the improved copolyester defined by claim 12.

19. An oriented heat set fiber of the improved copolyester defined by claim 12 wherein the proportion of succinic acid is 40 mole percent and the flow point is at about 228° C. under a stress of 2 g./denier.

20. Oriented heat set film of the improved copolyester defined by claim 10.

21. Oriented heat set film of the improved copolyester defined by claim 11.

22. Oriented heat set film of the improved copolyester defined by claim 12.

References Cited in the file of this patent
UNITED STATES PATENTS

| | | |
|---|---|---|
| 2,727,882 | Vodonik | Dec. 20, 1955 |
| 2,758,915 | Vodonik | Aug. 14, 1956 |
| 2,828,290 | Caldwell | Mar. 25, 1958 |
| 2,901,466 | Kibler | Aug. 24, 1959 |